United States Patent
Song (10) Patent No.: US 12,223,283 B2
(45) Date of Patent: Feb. 11, 2025

(54) CONVERSATIONAL ASPECT SENTIMENT ANALYSIS FOR DIALOGUE UNDERSTANDING

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

(*) Notice: Subject to any disclaimer, the term of this patent is extended or adjusted under 35 U.S.C. 154(b) by 435 days.

(21) Appl. No.: 17/503,584

(22) Filed: Oct. 18, 2021

(65) Prior Publication Data

US 2023/0118506 A1 Apr. 20, 2023

(51) Int. Cl.
*G06F 40/35* (2020.01)
*G06F 40/117* (2020.01)
*G06F 40/284* (2020.01)

(52) U.S. Cl.
CPC ............ *G06F 40/35* (2020.01); *G06F 40/117* (2020.01); *G06F 40/284* (2020.01)

(58) Field of Classification Search
CPC ................................ G06F 40/35; G06F 40/117
See application file for complete search history.

(56) References Cited

U.S. PATENT DOCUMENTS

| | | | |
|---|---|---|---|
| 2015/0286627 A1 | 10/2015 | Chang et al. | |
| 2017/0315987 A1 | 11/2017 | Srinivasan et al. | |
| 2019/0171660 A1* | 6/2019 | Kershaw | G06F 40/30 |
| 2020/0073937 A1* | 3/2020 | Zhao | G06F 40/30 |
| 2020/0104369 A1 | 4/2020 | Bellegarda | |
| 2020/0159997 A1 | 5/2020 | Wu et al. | |
| 2021/0034708 A1* | 2/2021 | Prasad | G06N 3/045 |
| 2022/0050972 A1* | 2/2022 | Usov | G06F 40/295 |
| 2022/0284171 A1* | 9/2022 | Laxman | G06F 40/284 |

FOREIGN PATENT DOCUMENTS

JP 2020052611 A 4/2020

OTHER PUBLICATIONS

Yang, Heng, et al. "A multi-task learning model for chinese-oriented aspect polarity classification and aspect term extraction." Neurocomputing 419 (2021): 344-356. (Year: 2021).*

(Continued)

*Primary Examiner* — Bhavesh M Mehta
*Assistant Examiner* — Nandini Subramani
(74) *Attorney, Agent, or Firm* — Sughrue Mion, PLLC (57) ABSTRACT

There is included a method and apparatus for sentiment analysis for multi-turn conversations comprising computer code for obtaining input dialogues; extracting sentiment expressions based on sentence embeddings corresponding to the input dialogues; generating polarity values based on the sentence embeddings corresponding to the input dialogues; and determining a target mention associated with at least one of the sentiment expressions based on the sentiment expressions and the sentence embeddings, wherein the determining of the target mention includes generating rich contextual representations based on the sentence embeddings and the sentiment expressions; and determining the target mention based on calculated boundaries, wherein the calculated boundaries are generated using the rich contextual representations.

17 Claims, 7 Drawing Sheets

(56) References Cited

OTHER PUBLICATIONS

Zhang, Yazhou, et al. "ScenarioSA: a dyadic conversational database for interactive sentiment analysis." IEEE Access 8 (2020): 90652-90664. (Year: 2020).*
International Search Report dated Dec. 23, 2022 in International Application No. PCT/US22/41515.
Written Opinion of the International Searching Authority dated Dec. 23, 2022 in International Application No. PCT/US22/41515.
Communication dated Nov. 5, 2024 from Japanese Patent Application No. 2023-547681.

* cited by examiner

CONVERSATIONAL ASPECT SENTIMENT ANALYSIS FOR DIALOGUE UNDERSTANDING

FIELD

Embodiments of the present disclosure relate to the field of sentiment analysis. More specifically, the present disclosure relates to dialogue understanding such as dialogue response generation and conversational question answering.

BACKGROUND

Modelling chat dialogues is an important field because of its potential in facilitating human-computer communications. Most studies so far have focused on designing end-to-end neural networks that consume only surface features. However, those models are not satisfactory in multi-turn conversation scenarios. Specifically, these models suffer from problems such as passive behavior during the conversation, and multi-turn responses that are often incoherent with each other.

To produce meaningful responses, effects of knowledge graphs (KG), commonsense knowledge, personalities and emotions have been investigated. However, such knowledge, e.g., a related KG, is usually not explicitly expressed in dialogues, and thus to be meaningful, human annotations are required along with the benchmark datasets. Additionally, since KGs are difficult to obtain for real-world scenarios and often require entity linking as a pre-requisite step, utilizing a related KG can introduce additional errors.

SUMMARY

The present disclosure addresses one or more technical problems. The present disclosure proposes a method and/or apparatus to extract internal knowledge from dialogues, which can be used for understanding fine-grained sentiment information and aid in dialogue understanding. The present disclosure adapts aspect based sentiment analysis to conversational scenario sentiment analysis. As an example, according to embodiments of the present disclosure, conversational aspect sentiment analysis may extract user opinions, polarity, and the corresponding mentions from dialogues. Based on the understanding that humans often express their emotions in relation to the entities they are talking about, extracting sentiment, polarity, and mentions may provide helpful features and general domain understanding. More specifically, accurately extracting people's emotions and corresponding entities from their dialogues may help chatbots plan subsequent topics and make the chatbots more active in multi-turn conversations. Another advantages of explicitly extracting sentiment and mentions include alleviation of data sparsity because the same sentiment and mention pair may appear in various texts and increase model interpretability, making it easier to combine this knowledge with other knowledge (e.g., KGs).

The present disclosure includes a method and apparatus for sentiment analysis for multi-turn conversations comprising memory configured to store computer program code and a processor or processors configured to access the computer program code and operate as instructed by the computer program code. The computer program code includes first obtaining code configured to cause the at least one processor to obtain input dialogues; first extracting code configured to cause the at least one processor to extract sentiment expressions based on sentence embeddings corresponding to the input dialogues; first generating code configured to cause the at least one processor to generate polarity values based on the sentence embeddings corresponding to the input dialogues; and first determining code configured to cause the at least one processor to determine a target mention associated with at least one of the sentiment expressions based on the sentiment expressions and the sentence embeddings, wherein the first determining code includes second generating code configured to cause the at least one processor to generate rich contextual representations based on the sentence embeddings and the sentiment expressions; and second determining code configured to cause the at least one processor to determine the target mention based on calculated boundaries, wherein the calculated boundaries are generated using the rich contextual representations.

According to embodiments, the second generating code includes third generating code configured to cause the at least one processor to generate turn-wise distances based on the sentence embeddings; forth generating code configured to cause the at least one processor to generate speaker information based on the sentence embeddings, wherein the speaker information indicates whether the input dialogues are from a same speaker; and first concatenating code configured to cause the at least one processor to concatenate the turn-wise distances, the speaker information, and the sentiment expressions.

According to embodiments, the second determining code includes fifth generating code configured to cause the at least one processor to generate a distribution based on the rich contextual representations and the sentiment expressions using one or more attention layers; and third determining code configured to cause the at least one processor to determine the target mention based on boundaries of the distribution.

According to embodiments, wherein the generating the distribution comprises determining a product of distributions of each of the one or more attention layers.

According to embodiments, wherein the determining the target mention based on the boundaries of the distribution comprises selecting boundaries of the distribution based on a highest score from a plurality of scores, wherein the plurality of scores is generated by determining a product of distributions of each of the one or more attention layers.

According to embodiments, the first extracting code includes sixth generating code configured to cause the at least one processor to generate a plurality of tags using a pre-trained machine learned model; and first inferring code configured to cause the at least one processor to infer the sentiment expressions based on the plurality of tags.

According to embodiments, the first generating code includes sixth generating code configured to cause the at least one processor to generate a plurality of tags using a pre-trained machine learned model; and first inferring code configured to cause the at least one processor to infer the sentiment expressions based on the plurality of tags.

According to embodiments, wherein the polarity values are one of positive, negative, or neutral.

According to embodiments, wherein the sentence embeddings are generated based on the input dialogues.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The present disclosure relates to extraction of internal knowledge from dialogues, which can be used for understanding fine-grained sentiment information and aid in dialogue understanding. The present disclosure adapts aspect based sentiment analysis to conversational scenario sentiment analysis. As an example, according to embodiments of the present disclosure, conversational aspect sentiment analysis may extract user opinions, polarity, and the corresponding mentions from dialogues. Based on the understanding that humans often express their emotions in relation to the entities they are talking about, extracting sentiment, polarity, and mentions may provide helpful features and general domain understanding. More specifically, accurately extracting people's emotions and corresponding entities from their dialogues may help chatbots plan subsequent topics and make the chatbots more active in multi-turn conversations. Another advantages of explicitly extracting sentiment and mentions include alleviation of data sparsity because the same sentiment and mention pair may appear in various texts and increase model interpretability, making it easier to combine this knowledge with other knowledge (e.g., KGs).

Consider an example multi-turn conversation in Table 1.

TABLE 1

| |
| --- |
| A: Did you see the match between Argentina and Brazil last night? |
| B: Yes, of course. |
| A: Messi contributed two goals, while Neymar got nothing. |
| B: Yeah, the goalkeeper was just stunned. |
| A: His overall performance is terrific! |
| B: Yes, it is. |

Accurately extracting people's emotions and corresponding entities from their dialogues may help chatbots plan subsequent topics and make the chatbots more active in multi-turn conversations. As an example, if a user mentions that he/she is a super fan of the soccer player "Lionel Messi", then a chatbot may mention the recent news of Messi. Further, since explicit sentiment, polarity, and/or mention extractions may include understanding the whole dialogue history, it may make it easier to combine the extractions with other knowledge (e.g. an external KG) making models more interpretable. Continuing with the example of "Lionel Messi," by combining the parsing results of sentiment and model extraction with external KGs, the chatbot may even recommend the recent match of Messi's soccer club "Futbol Club Barcelona".

In available datasets, sentiment analysis contain very limited number of instances, and they only cover a few domains (such as reviews of hotels and restaurants), while daily conversations are open-domain. Additionally, in those datasets, sentiment expressions are usually close to its corresponding aspect or mention within a short sentence. In reality however, sentiment expressions and their mentions or aspects may be several statements apart, with ellipses and anaphora introducing more complexity of reasoning. As an example, consider sentences from Table 1: the mention "Messi" appears in the third utterance, while the corresponding sentiment word "terrific" is in the fifth utterance. Moreover, "Neymar" introduces further challenges as a highly confusing candidate mention. This is just a 3-turn instance, let alone the in-creasing complexity with more turns.

According to embodiments, sentiment extraction may find all sentiment expressions from the last user utterance and determine the polarity of each extracted sentiment expression. According to embodiments, mention extraction may extract the corresponding mention from the dialogue history for each sentiment expression. Mention extractions may include understanding the whole dialogue history, using rich features such as information about sentence-wise speakers and speaker IDs to aid the modelling of long-distance dependencies.

In some embodiments, example or training dataset may be annotated manually. As an example, dataset may include many dialogues from a plurality of datasets, wherein each dialogue may include a plurality of sentences. As a first pass, human and/or expert annotators may be asked to annotates and/or label each dialogue. In some embodiments, they may be asked to annotate based on guidelines according to the state of the art. The annotations may include not just sentiment expressions in the sentences but also polarity values for each mention. The annotations may follow other guidelines. As an example, the annotated mentions must be specific; for multiple mentions corresponding to the same entity, only the most specific ones must be annotated; and only mentions with corresponding sentiment expressions may be annotated, so as to train the model on explicit user opinion.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
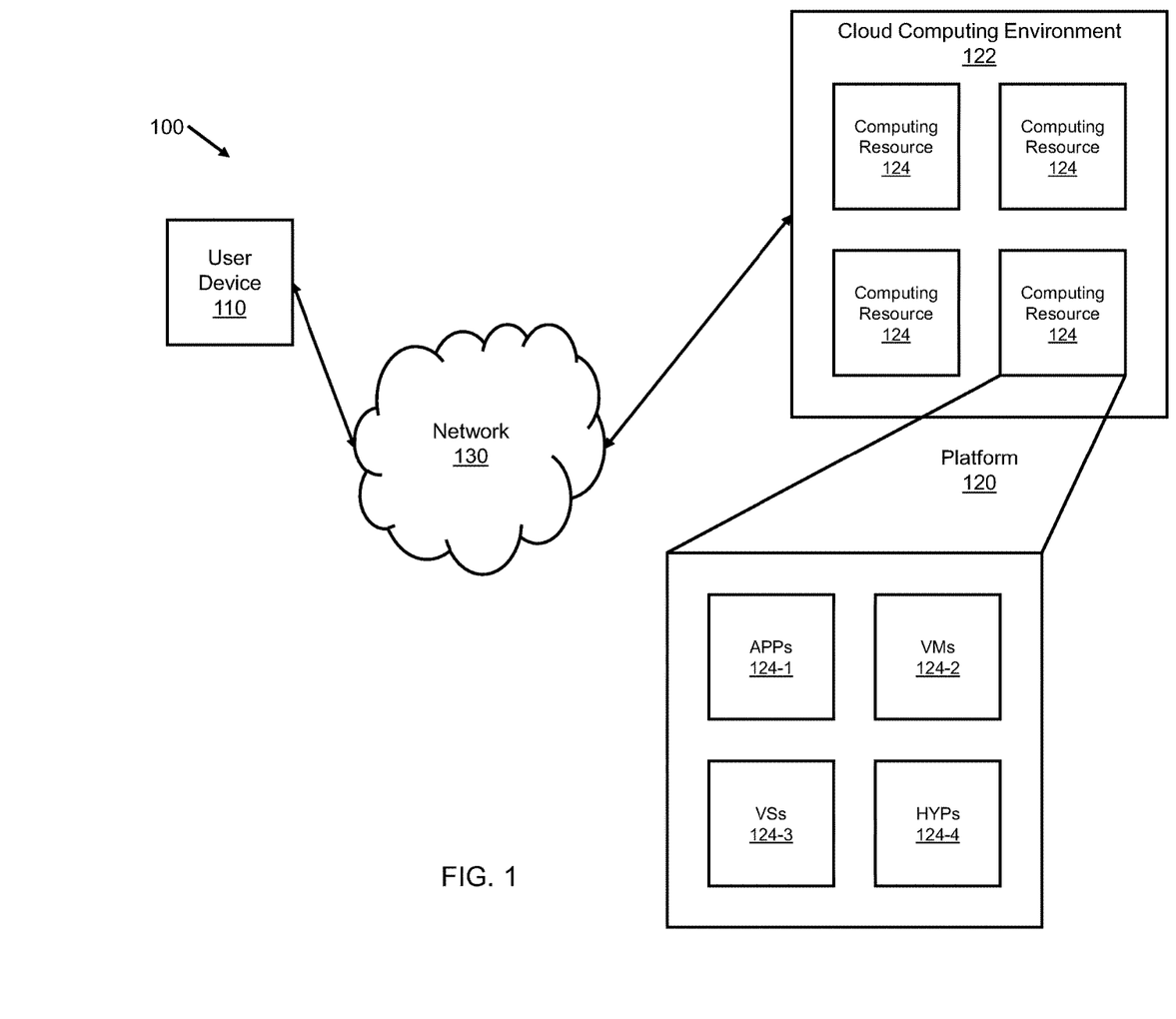
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
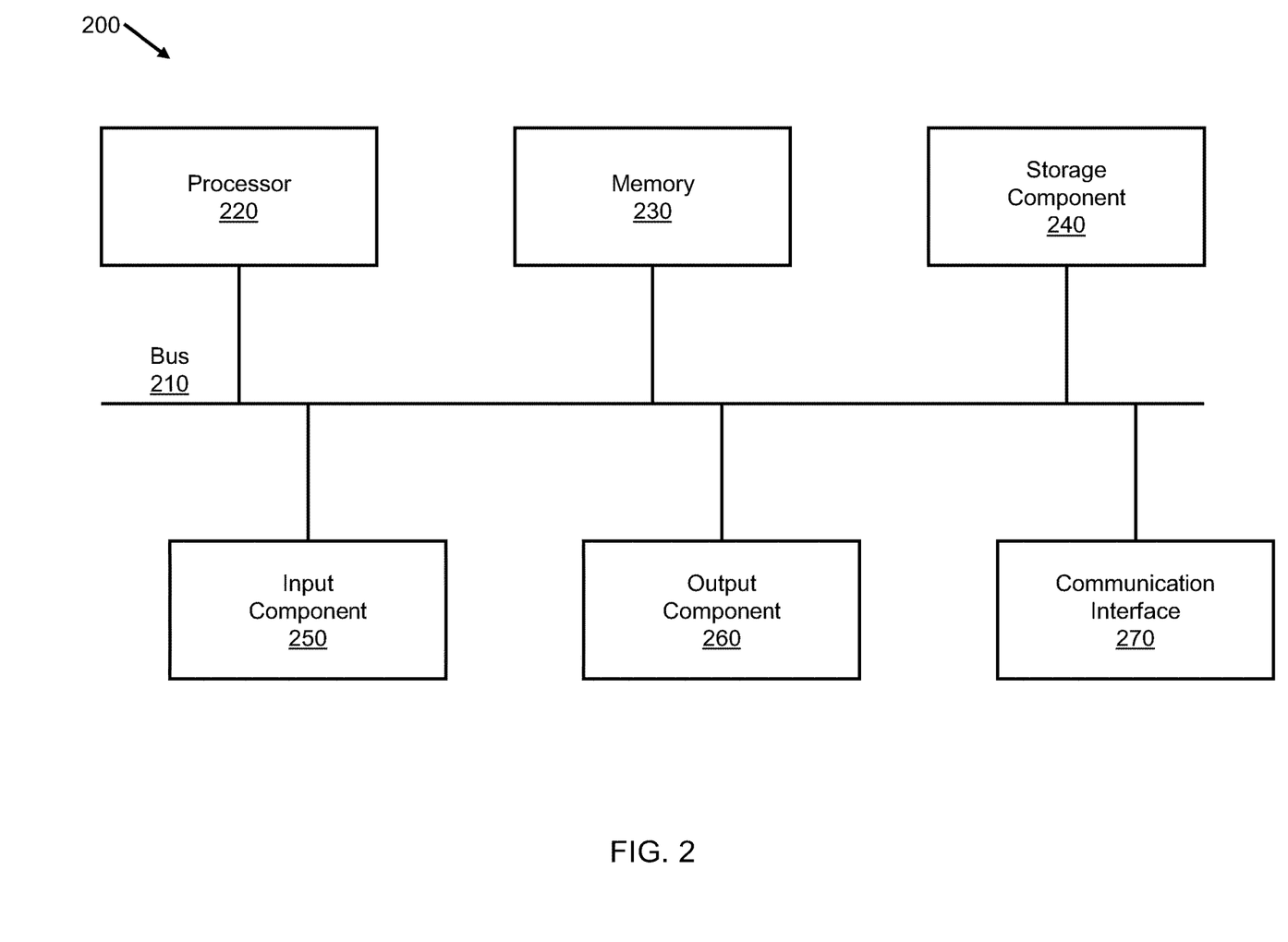
FIG. 2 is a diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
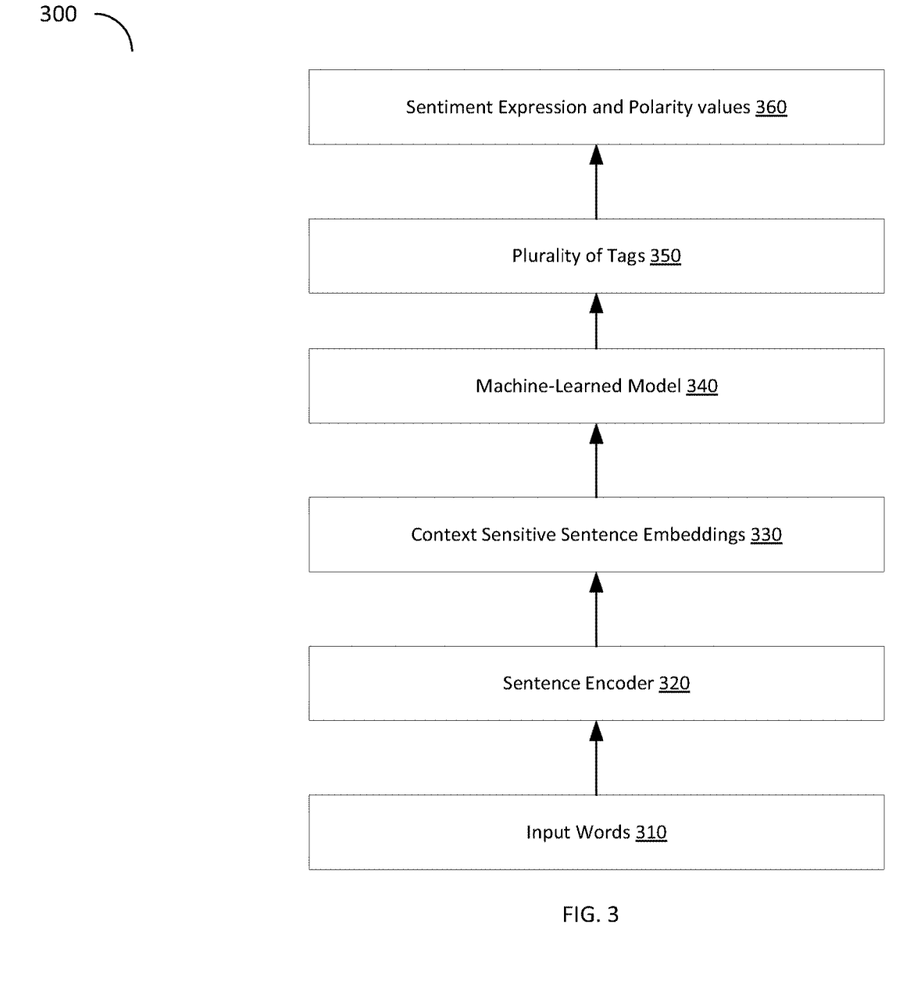
FIG. 3 is a simplified block diagram illustrating a model for sentiment extraction according to embodiments of the disclosure.

FIG. 3 is a simplified diagram illustrating an exemplary model 300 for sentiment extraction according to embodiments of the disclosure.

According to embodiments, the input for conversational aspect sentiment analysis for understanding multi-turn conversations may be one or more input dialogues. A multi-turn conversation may be a dialogue utterance that includes one or more sentences from one or more speakers. As an example, a multi-turn conversations may be a back and forth conversation where the previous question's and/or sentence's context influences the response or the next question and/or sentence. An input dialogue may include one or more sentences. In some embodiments, the input for conversational aspect sentiment analysis for understanding multi-turn conversations may be one or more input dialogues and/or sentences decomposed into words. As an example, a list of dialogue utterances may include $X_1, X_2, \ldots, X_i$, where $X_j$ is a sentence in the dialogue utterance and $X_i = w_i^1, \ldots, w_i^{N_i}$ where $w_i^{N_i}$ represents the input words (310) in the latest dialogue turn and $N_i$ represents the length of $X_i$.

Sentiment extraction may include extracting all sentiment expressions from an input dialogue. Polarity extraction may include extracting polarity values corresponding to each sentiment. As an example, sentiment and/or polarity extraction (360) may include extracting all sentiment expressions $\{s_1, \ldots, s_M\}$ and their polarity values $\{p_1, \ldots, p_M\}$ (sentiment extraction, SE) from $X_i$. In some embodiments, each sentiment expression may be a word and/or a phrase in the input dialogue. As an example, sentiment expression $s_j$ can be a word or a phrase within turn $X_i$, and its polarity value $p_j$ is chosen from three possible values: −1 (negative), 0 (neural) and +1 (positive).

In some embodiments, a sentence encoder (320) may be used to identify sentiment expressions and polarities from the input dialogues. As an example, sentence encoder (320) may be used, wherein the sentence encoder (320) may be modelled to treat extracting sentiment expressions and detecting their polarities as a sequence labelling task. In some embodiments, the sentence encoder (320) may adopt a pre-trained model, such as a pre-trained BERT model to generate context-sensitive embeddings for an input words (310) $w_1, \ldots, ww_{N_i}$. In some embodiments, the sentence encoder (320) may adopt multiple self-attention layers to generate context-sensitive embeddings (330) for an input sentence $w_1, \ldots, ww_{N_i}$. The generation of context-sensitive sentence embeddings (330) may be represented using Equation (1), which may be as follows:

$$b_i^1, \ldots, b_i^{N_i} = \text{Encoder}_{SE}(w_i^1, \ldots, w_i^{N_i}) \quad \text{Equation (1)}$$

In some embodiments, the context-sensitive sentence embeddings (330) may be input into a neural network and/or machine-learned model (340) to generate a plurality of tags for each input word, sentence, and/or dialogue. As an example, the context-sensitive sentence embeddings (330) $b_i^1, \ldots, b_i^{N_i}$ may be input into a multi-layer perceptron (MLP) with a plurality of output units and softmax activation to predict one or more tags (350) for each input word (310) (e.g., $w_i^k$). Sentence expressions and their polarities may then be inferred from the one or more tags. As an example, the model is supposed to produce tags "O O O O Pos-B O" for the sentence "His overall performance is terrific !" in Table 1, and a positive sentiment expression "terrific" is then detected from the tags.

Figure 4:
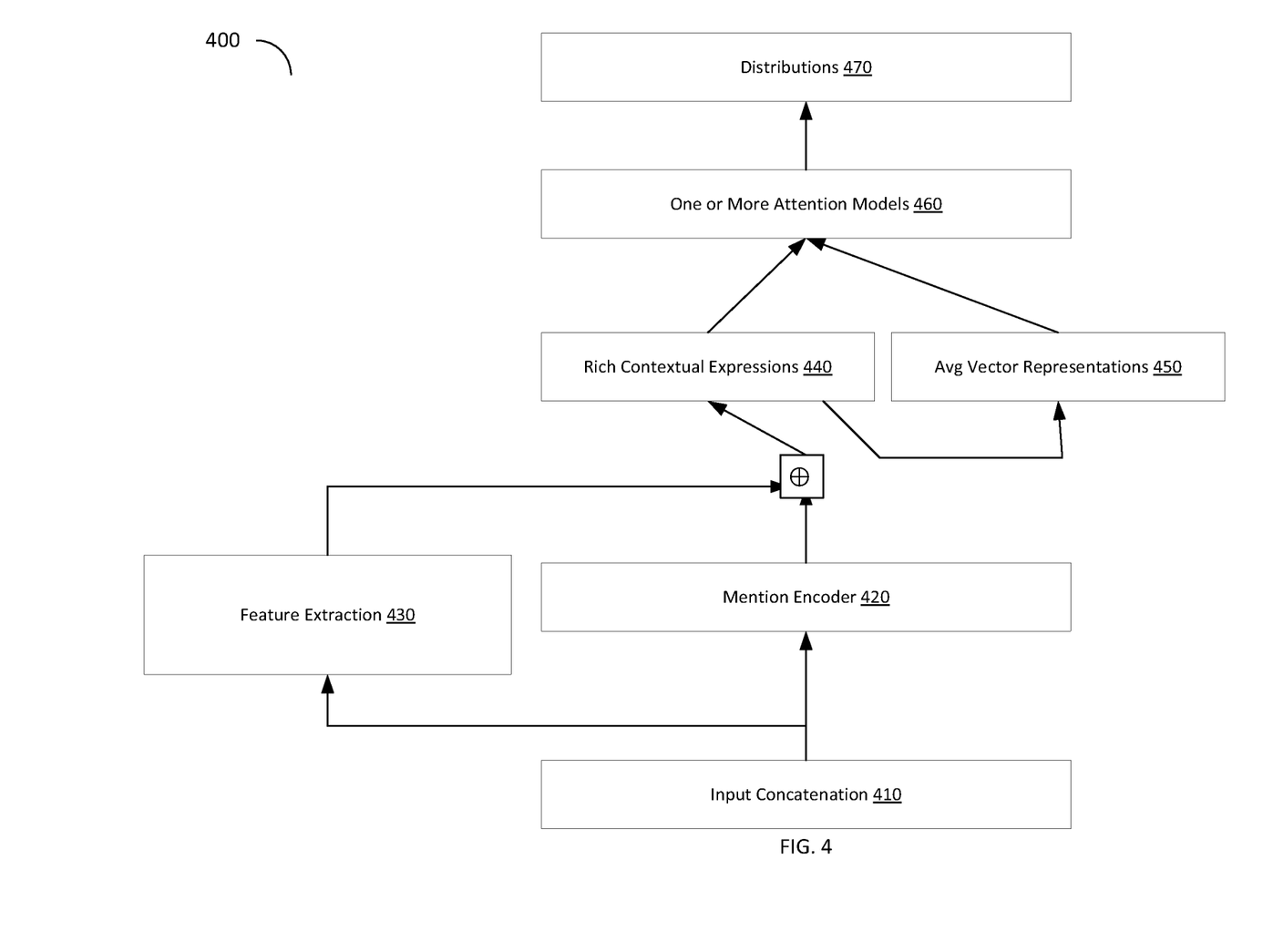
FIG. 4 is a simplified block diagram illustrating a model for mention extraction according to embodiments of the disclosure.

FIG. 4 is a simplified diagram illustrating an exemplary model 400 for mention extraction according to embodiments of the disclosure.

In some embodiments, the sentiment expressions and their polarities may be input into a mention extractor model to extract the corresponding mention for at least one sentiment expression. In some embodiments, an mention encoder (420) may be adopted to extract the corresponding mention $m_j$ for each sentiment expression $s_j$. In some embodiments mention extraction may be based on sentiment expressions and the context-sensitive sentence embeddings. In some embodiments mention extraction may be based on an input concatenation (410) based on sentiment expressions and the contextual embeddings. As an example, a concatenation of all dialogue turns $w_1^1, \ldots, w_i^{N_i}$ and the associated expression $s_j$ may be used as inputs to the mention encoder (420). In some embodiments, the mention encoder (420) may be implemented using one or more encoders based on self-attention and/or pre-trained BERT to obtain contextual embeddings. The generation of contextual embeddings may be represented using Equation (2) as follows:

$$b_1^1, \ldots, b_i^{N_i}, b_{SEP}, b_{s_j}^1, \ldots, b_{s_j}^{|s_j|} = Encoder_{ME}(w_1^1, \ldots, w_i^{N_i}, [SEP], w_{s_j}^1, \ldots, w_{s_j}^{|s_j|}) \ldots \text{Equation (2)}$$

where $w_{s_j}^1, \ldots, w_{s_j}^{|s_j|}$ represent the tokens of the sentiment expression $s_j$, and [SEP] may be an artificial token to separate a context and a sentiment expression. In some embodiments, the vectors of last sub-word units may be used to obtain word-level representations.

Mention extraction may require longer-distance reasoning throughout the whole dialogue. In some embodiments, rich features including turn-wise distances and speaker information to model the cross-sentence correlations may be used. In some embodiments, a feature extractor (430) may be used to generate rich features including turn-wise distances and speaker information to model the cross-sentence correlations. In some embodiments, the turn-wise distances may be relative distances to the current turn that are bucketed into [0, 1, 2, 3, 4, 5+, 8+, 10+]. Speaker information may be a binary feature indicating whether a token in the dialogue history is from the same speaker as the current turn. Both types of information may be represented by embeddings. As an example, $d_k^l$ and $s_k^l$ may correspond to the distance embedding (turn-wise distances) and the speaker embedding (speaker information) for token $w_k^l$. The distance embedding, speaker embedding, sentence embedding, and/or contextual embedding may be concatenated with the encoder outputs (i.e., $b_k^l$) to obtain the rich contextual representations (440):

$$e_k^l = b_k^l \oplus d_k^l \oplus s_k^l \qquad \text{Equation (3)}$$

where $\oplus$ denotes the concatenation operation. In some embodiments, a concatenated dialogue-history representation may be generated using rich contextual expressions (440). The concatenated dialog-history representation may be expressed as a concatenation of the rich contextual expressions of all the sentences in the input dialogue.

$$E_{iag} = [e_1^1; \ldots; e_i^{N_i}] \qquad \text{Equation (4)}$$

In some embodiments, average vector representation (450) representing the whole sentiment expression $s_j$ may be generated by averaging the contextual representations of all tokens within it. The average vector representation (450) may be represented using Equation (5).

$$e_{s_j} = \text{Avg}(e_{s_j}^1, \ldots, e_{s_j}^L) \qquad \text{Equation (5)}$$

where L is the length of $s_j$. Using the average vector representation (450)($e_{s_j}$) for the sentiment expression and the concatenated dialogue-history representation ($E_{iag} = [e_1^1; \ldots; e_i^{N_i}]$) as the query and memory, one or more attention models (460) may be used to calculate the distributions (470) for the start (st) and end (ed) boundaries of a target mention, respectively. If two attention models are used, the overall distributions (470) for the target mention may be defined as the product of both distributions:

$$\phi_{st} = \text{Attention}_{st}(E_{diag}, e_{s_j}) \qquad \text{Equation (6)}$$

$$\phi_{ed} = \text{Attention}_{ed}(E_{diag}, e_{s_j}) \qquad \text{Equation (7)}$$

$$\phi = \phi_{st} \phi_{ed} \qquad \text{Equation (8)}$$

According to embodiments, the target mention (st, ed) may be produced by choosing both boundaries st and ed that yield the highest score from φ[st, ed], where st≤ed and St and ed may be in the same utterance.

Figure 5:
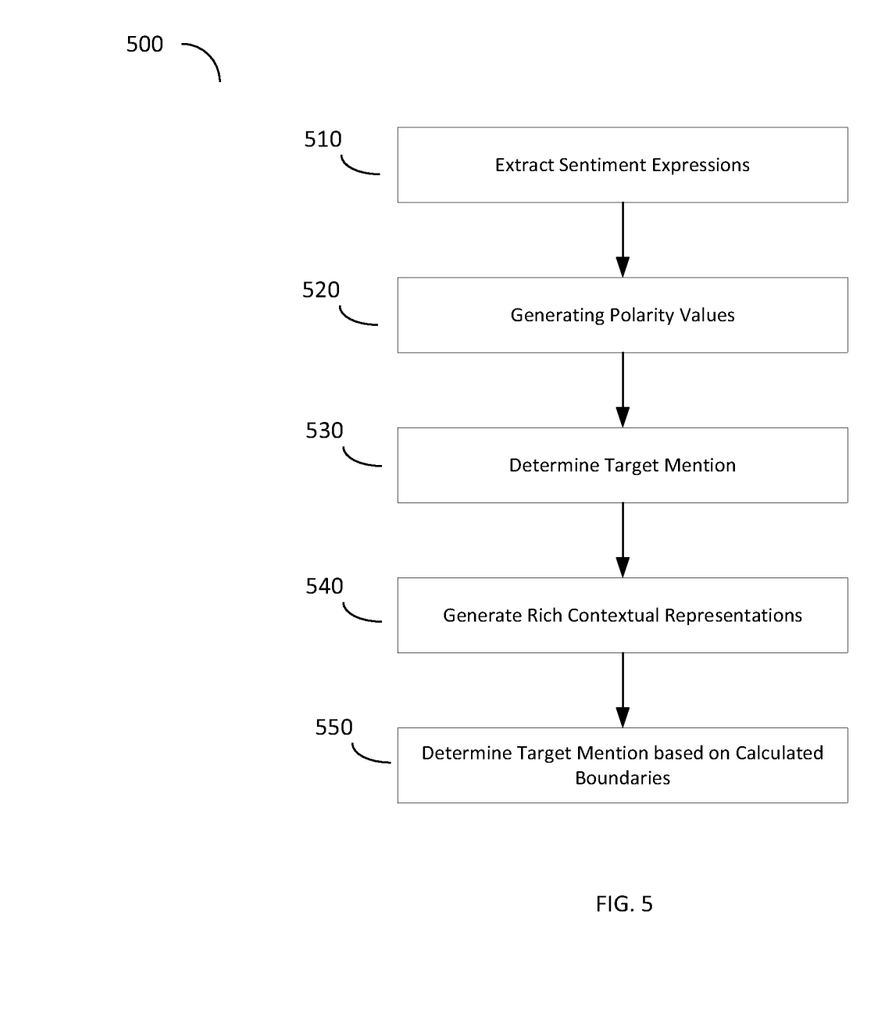
FIG. 5 is a simplified flowchart for conversational aspect sentiment analysis according to the embodiments of the disclosure.

FIG. 5 is a simplified flowchart illustrating an example process 500 for conversational aspect sentiment analysis according to the embodiments of the disclosure.

At operation 510, sentiment expressions may be extracted from sentence embeddings corresponding to input dialogues, sentences, and/or words. As an example, input words (310) may be used to extract sentiment expressions. In some examples, the sentiment expressions may be extracted from the input dialogues, sentences, and/or words using an encoder. As an example, a sentence encoder (320) may be used to extract sentiment expressions. In some embodiments, a specific sentence encoder may be used. In some embodiments, any method and/or model may be used as an encoder.

In some embodiments, there may be a preceding operation performed prior to extracting sentiment expression including obtaining input dialogues, sentences, and/or words. In some embodiments, extracting sentiment expressions may include generating a plurality of tags using a pre-trained machine learned model and inferring the sentiment expressions based on the plurality of tags. As an example, extracting sentiment expressions may include generating a one or more tags (350) using a pre-trained machine learned model (340) and inferring the sentiment expressions based on the plurality of tags. As an example, a pre-trained BERT model and/or attention layers may be used to generating a plurality of tags and infer the sentiment expression from the tags.

At operation 520, polarity values may be extracted from sentence embeddings corresponding to the input dialogues, sentences, and/or words. As an example, input words (310) may be used to extract polarity values. Polarity values may be associated to one or more sentiment expressions. In some embodiments, each polarity value may be associated with a sentiment expression. In some examples, the polarity values may be extracted from the input dialogues, sentences, and/or words using an encoder. As an example, a sentence encoder (320) may be used to extract polarity values. In some embodiments, a specific sentence encoder may be used. In some embodiments, any method and/or model may be used as an encoder.

At operation 530, a target mention may be determined based on the sentiment expressions, the polarity values, and/or the sentence embeddings. In some embodiments, the target mention may be associated with at least one sentiment expression. Determining the target mention for a sentiment expression may include, at 540, generating rich contextual representations based on the sentence embeddings and the sentiment expressions. Determining the target mention for a sentiment expression may also include, at 550, determining the target mention based on calculated boundaries, wherein the calculated boundaries are generated using the rich contextual representations. As an example, rich contextual representations (440) may be generated using distance embedding, speaker embedding, sentence embedding, and/or contextual embedding generated by mention encoder (420) and/or feature extractor (430). In some embodiments, rich contextual representations (440) and average vector representation (450) may be used as input to one or more attention models (460) to calculate boundaries.

Figure 6:
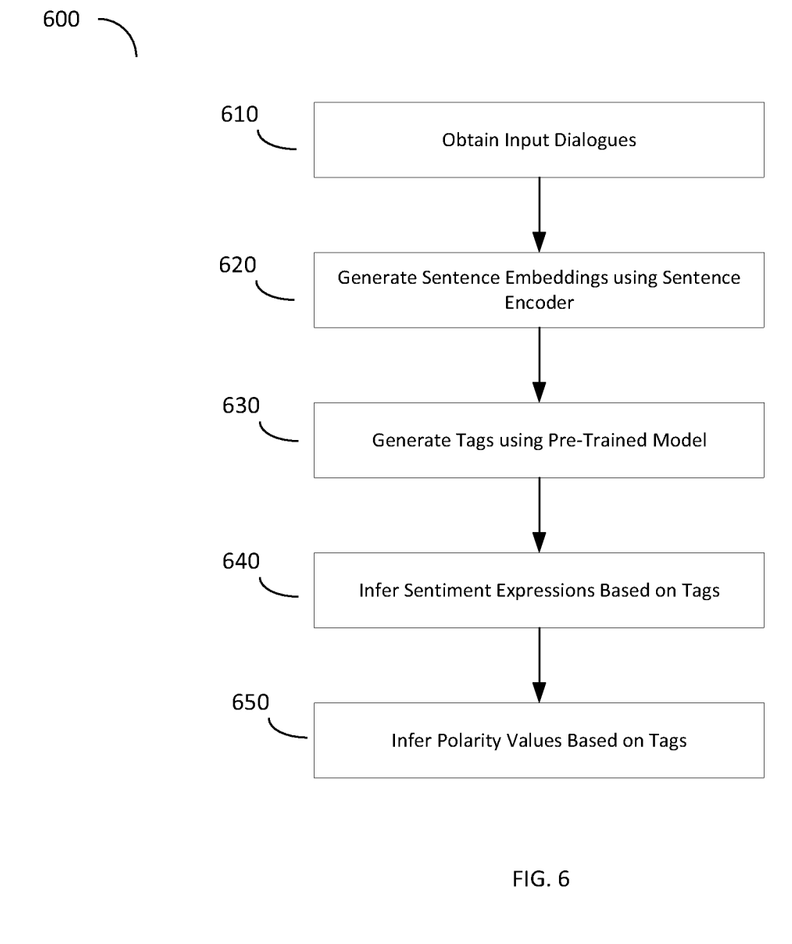
FIG. 6 is a simplified flowchart for conversational aspect sentiment analysis according to the embodiments of the disclosure.

FIG. 6 is a simplified flowchart illustrating an example process 600 for conversational aspect sentiment analysis according to the embodiments of the disclosure.

At operation 610, input dialogues may be obtained. Input dialogues my include one or more sentences and/or words. In some embodiments, input dialogues may include a multi-turn conversation with one or more speakers.

At operation 620, sentence embeddings may be generated using a sentence encoder. As an example, sentence embeddings may be generated using sentence encoder (320). As an example, sentence encoder (320) may be used, wherein the sentence encoder (320) may be modelled to treat extracting sentiment expressions and detecting their polarities as a sequence labelling task. In some embodiments, the sentence encoder (320) may adopt a pre-trained model, such as a pre-trained BERT model to generate context-sensitive embeddings for an input words (310) $w_1, \ldots, ww_{N_i}$. In some embodiments, the sentence encoder (320) may adopt multiple self-attention layers to generate context-sensitive embeddings (330) for an input sentence $w_1, \ldots, ww_{N_i}$.

In some embodiments, at operation 630, one or more tags may be generated based on the sentence embeddings using a pre-trained model. As an example, the context-sensitive sentence embeddings (330) may be input into a neural network and/or machine-learned model (340) to generate a plurality of tags for each input word, sentence, and/or dialogue. In some embodiments, the context-sensitive sentence embeddings (330) may be input into a multi-layer perceptron (MLP) with a plurality of output units and softmax activation to predict one or more tags (350) for each input word (310) (e.g., $w_i^k$). Sentence expressions and their polarities may then be inferred from the one or more tags, at operation 640 and 650 respectively.

Figure 7:
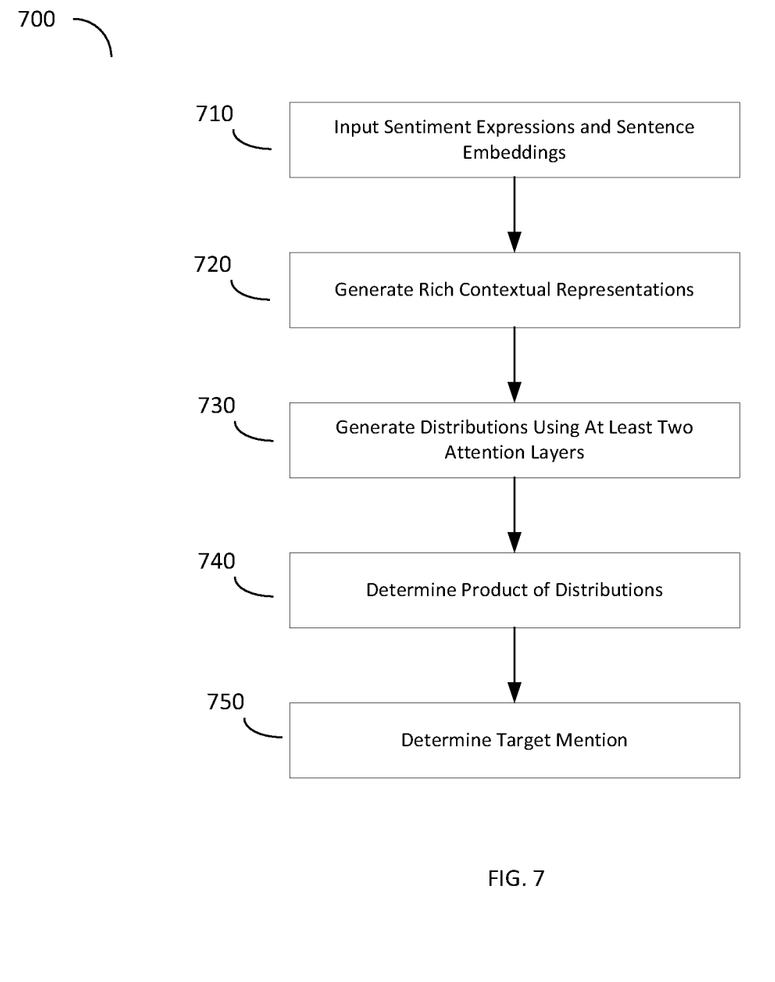
FIG. 7 is a simplified flowchart for conversational aspect sentiment analysis according to the embodiments of the disclosure.

FIG. 7 is a simplified flowchart illustrating an example process 700 for conversational aspect sentiment analysis according to the embodiments of the disclosure.

At operation 710, sentiment expressions and sentence embeddings may be input into one or more models. As an example, sentiment expressions and sentence embeddings may be input into the mention encoder (420) and/or the feature extractor to (430).

At operation 720, rich contextual representations may be generated using sentiment expressions and sentence embeddings. In some embodiments, rich contextual representations may be generated based on sentiment expressions and sentence embeddings using one or more models. As an example, rich contextual representations may be generated based on sentiment expressions and sentence embeddings using the mention encoder (420) and/or the feature extractor to (430).

In some embodiments, the generating of the rich contextual representations based on the sentence embeddings and the sentiment expressions may include generating turn-wise distances based on the sentence embeddings, generating speaker information based on the sentence embeddings, and concatenating the turn-wise distances, the speaker information, and the sentiment expressions to generate rich contextual representations. In some embodiments, the speaker information may indicate whether the input dialogues are from a same speaker. In some embodiments, generation of rich contextual information may also include generating an average vector representation representing the whole sentiment expression by averaging the contextual representations of all tokens within it.

In some embodiments, the mention encoder (420) may be implemented using one or more encoders based on self-attention and/or pre-trained BERT to obtain contextual embeddings. In some embodiments, the feature extractor (430) may be implemented using one or more encoders based on self-attention and/or pre-trained BERT to obtain contextual embeddings.

At operation 730, distributions may be generated using at least two attention layers and/or attention models based on the rich contextual information. As an example, rich contextual representations (440) and average vector representation (450) may be input into one or more attention models (460) to obtain one or more distributions.

At operation 740, a product of the generated distributions from each of the one or more attention layers may be determined. In some embodiments, determining the product of the generated distributions may include generating a plurality of scores.

At operation 750, a target associated to at least one sentiment expression mention may be determined based on the boundaries of the distribution. In some embodiments, determining the target mention may include selecting boundaries of the distribution based on a highest score from the plurality of scores. In some embodiments, determining the target mention may include selecting boundaries of the distribution based on a highest score from a plurality of scores, wherein the plurality of scores is generated by determining a product of distributions of each of the one or more attention layers. As an example, the target mention may be produced by choosing boundaries from each attention model that yields the highest score from the product of the distributions. In some embodiments, the selected boundary from one attention model may be smaller than the selected boundary from the other attention model. In some embodiments, both boundaries may belong to the same utterance.

Example advantages of the present disclosure may be described as follows.

Table 2 displays performance of the embodiments of the present disclosure. As seen in Table 2, the present disclosure using BERT model delivers the best scores in identifying sentiments and mentions in multi-turn conversations.

TABLE 2

| Encoder | DuConv (in-domain) | | | | NewsDialogue (out-of-domain) | | | |
|---|---|---|---|---|---|---|---|---|
| | SE | $SE_{unlabeled}$ | ME | $ME_{cross}$ | SE | $SE_{unlabeled}$ | ME | $ME_{cross}$ |
| Self-Attention | 55.67 | 55.97 | 26.14 | 20.39 | 20.72 | 21.13 | 22.32 | 18.71 |
| BERT-freeze | 71.95 | 72.20 | 50.55 | 58.39 | 43.90 | 44.42 | 39.31 | 40.03 |
| BERT | 78.44 | 78.89 | 79.08 | 80.95 | 52.39 | 52.78 | 63.97 | 58.65 |

Table 3 displays performance of the embodiments of the present disclosure. As seen in Table 3, the present disclosure using one or more transformers delivers the best scores in identifying sentiments and mentions in multi-turn conversations.

TABLE 3

| Model | BLEU-1/2 | Distinct-1/2 | Avg. KN Len. |
|---|---|---|---|
| Transformer | 29.9/17.3 | 3.6/18.6 | 0.0 |
| w/ Full Doc | 30.1/17.3 | 3.1/16.4 | 765.5 |
| w/ CASA | 29.7/17.4 | 3.7/19.2 | 29.1 |

As seen in Table 3, the average length of utilized knowledge as demonstrated in column "Avg. KN Len." Using full news documents gives slight increase in BLEU scores, but the diversity of outputs decreases as indicated by the Distinct scores. Taking only the selected segments according to embodiments of the present disclosure improves the diversity regarding Distinct score and shows a comparable BLEU score. More importantly, only 29 Chinese characters on average are selected by embodiments of the present disclosure, while the full-document baseline uses 765 characters. This shows that embodiments of the present disclosure may save 96% memory usage for representing relevant knowledge.

Although FIGS. 5-7 show example blocks of the processes 500, 600, and 700, in embodiments, the processes 500, 600, and 700, may include additional blocks, fewer blocks, different blocks, or differently arranged blocks than those depicted in FIGS. 5-7. In embodiments, any blocks of processes 500, 600, and 700, may be combined or arranged in any amount or order, as desired. In embodiments, two or more of the blocks of the processes 500, 600, and 700, may be performed in parallel.

The techniques described above, can be implemented as computer software using computer-readable instructions and physically stored in one or more computer-readable media or by a specifically configured one or more hardware processors. For example, FIG. 1 shows an environment 100 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for sentiment analysis for multi-turn conversations, the method comprising:
   obtaining an input dialogue, wherein the input dialogue has more than one sentence;
   extracting at least one sentiment expression based on sentence embeddings corresponding to the input dialogue;
   generating polarity values corresponding to the at least one sentiment expression based on the sentence embeddings corresponding to the input dialogue; and
   subsequent to determining the polarity values, determining a target mention associated with the input dialogue based on the at least one sentiment expression and the sentence embeddings,
   wherein the determining of the target mention comprises:
      generating rich contextual representations based on a concatenation of turn-wise distances on the sentence embeddings, speaker information on the sentence embeddings, and the at least one sentiment expression, wherein the speaker information indicates whether the input dialogue are from a same speaker; and
      determining the target mention based on calculated boundaries, wherein the calculated boundaries are generated using the rich contextual representations.

2. The method of claim 1, wherein the determining of the target mention based on calculated boundaries comprises:
   generating a distribution based on the rich contextual representations and the at least one sentiment expression using one or more attention layers; and
   determining the target mention based on boundaries of the distribution.

3. The method of claim 2, wherein the generating of the distribution comprises determining a product of distributions of each of the one or more attention layers.

4. The method of claim 2, wherein the determining of the target mention comprises selecting boundaries of the distribution based on a highest score from a plurality of scores, wherein the plurality of scores is generated by determining a product of distributions of each of the one or more attention layers.

5. The method of claim 1, wherein the sentence embeddings are generated based on the input dialogue.

6. The method of claim 1, wherein the extracting the at least one sentiment expression from the sentence embeddings comprises:
   generating a plurality of tags using a pre-trained machine learned model; and
   inferring the at least one sentiment expression based on the plurality of tags.

7. The method of claim 1, wherein the generating the polarity values from the sentence embeddings comprises:
generating a plurality of tags using a pre-trained machine learned model; and
inferring the polarity values based on the plurality of tags.

8. The method of claim 1, wherein the polarity values are one of positive, negative, or neutral.

9. An apparatus for sentiment analysis for multi-turn conversations, the apparatus comprising:
at least one memory configured to store computer program code;
at least one processor configured to access the computer program code and operate as instructed by the computer program code, the computer program code including:
first obtaining code configured to cause the at least one processor to obtain input dialogue;
first extracting code configured to cause the at least one processor to extract at least one sentiment expression based on sentence embeddings corresponding to the input dialogue;
first generating code configured to cause the at least one processor to generate polarity values based on the sentence embeddings corresponding to the input dialogue; and
first determining code configured to cause the at least one processor to, subsequent to determining the polarity values, determine a target mention associated with the input dialogue based on the at least one sentiment expression and the sentence embeddings, wherein the first determining code comprises:
second generating code configured to cause the at least one processor to generate rich contextual representations based on a concatenation of turn-wise distances on the sentence embeddings, the speaker information on the sentence embeddings, and the at least one sentiment expression, wherein the speaker information indicates whether the input dialogue are from a same speaker; and
second determining code configured to cause the at least one processor to determine the target mention based on calculated boundaries, wherein the calculated boundaries are generated using the rich contextual representations.

10. The apparatus of claim 9, wherein the second determining code comprises:
fifth generating code configured to cause the at least one processor to generate a distribution based on the rich contextual representations and the at least one sentiment expression using one or more attention layers; and
third determining code configured to cause the at least one processor to determine the target mention based on boundaries of the distribution.

11. The apparatus of claim 10, wherein the generating the distribution comprises determining a product of distributions of each of the one or more attention layers.

12. The apparatus of claim 10, wherein the determining the target mention based on the boundaries of the distribution comprises selecting boundaries of the distribution based on a highest score from a plurality of scores, wherein the plurality of scores is generated by determining a product of distributions of each of the one or more attention layers.

13. The apparatus of claim 9, wherein the first extracting code comprises:
sixth generating code configured to cause the at least one processor to generate a plurality of tags using a pre-trained machine learned model; and
first inferring code configured to cause the at least one processor to infer the at least one sentiment expression based on the plurality of tags.

14. The apparatus of claim 9, wherein the first generating code comprises:
sixth generating code configured to cause the at least one processor to generate a plurality of tags using a pre-trained machine learned model; and
first inferring code configured to cause the at least one processor to infer the at least one sentiment expression based on the plurality of tags.

15. The apparatus of claim 9, wherein the polarity values are one of positive, negative, or neutral.

16. A non-transitory computer readable medium storing a program causing a computer to execute a process, the process comprising:
obtaining input dialogue;
extracting at least one sentiment expression based on sentence embeddings corresponding to the input dialogue;
generating polarity values based on the sentence embeddings corresponding to the input dialogue; and
subsequent to determining the polarity values, determining a target mention associated with the input dialogue based on the at least one sentiment expression and the sentence embeddings,
wherein the determining of the target mention comprises:
generating rich contextual representations based on a concatenation of turn-wise distances on the sentence embeddings, the speaker information on the sentence embeddings, and the at least one sentiment expression, wherein the speaker information indicates whether the input dialogue are from a same speaker; and
determining the target mention based on calculated boundaries, wherein the calculated boundaries are generated using the rich contextual representations.

17. The non-transitory computer readable medium of claim 16, wherein the determining of the target mention based on calculated boundaries comprises:
generating a distribution based on the rich contextual representations and the at least one sentiment expression using one or more attention layers; and
determining the target mention based on boundaries of the distribution.

* * * * *